United States Patent [19]

Cok

[11] Patent Number: 5,032,910

[45] Date of Patent: Jul. 16, 1991

[54] MECHANISM FOR PRODUCING INTERPOLATED COLOR VALUES FOR A SAMPLED COLOR IMAGE SIGNAL USING A LINEAR EQUATION TECHNIQUE

[75] Inventor: David R. Cok, Rochester, N.Y.

[73] Assignee: Eastman Kodak Company, Rochester, N.Y.

[21] Appl. No.: 415,826

[22] Filed: Oct. 2, 1989

[51] Int. Cl.$^5$ .............................................. H04N 9/04
[52] U.S. Cl. ........................................ 358/13; 358/41
[58] Field of Search ...................... 358/41, 43, 44, 163, 358/213.15, 213.17, 428, 13

[56] References Cited

U.S. PATENT DOCUMENTS 4,125,856 11/1978 Netravali et al. ...................... 358/13

Primary Examiner—Howard W. Britton
Assistant Examiner—Kim Yen Vu
Attorney, Agent, or Firm—Edward Dugas

[57] ABSTRACT

Color fringing of edges between regions of different color in an interpolated image is effectively avoided by a signal processing technique that infers the existence of a color edge in response to prescribed changes in image characteristics at sample points for which data is available, and then interpolates intermediate values that are associated with a color edge using a linear equation. A first signal value, associated with a first band containing information of a first image characteristic (e.g. the green component) is fully sampled at a first spatial frequency, and a second signal value, associated with a second band containing information of a second characteristics (e.g. a red-green differential) is sampled at a second spatial frequency, lower than the first spatial frequency, so that interpolation of the second signal values is required. Differences between first sampled signal values, associated with sampling locations of the second sampled signal values, are measured. If the measured difference for successive fully sampled values is greater than a prescribed threshold value, the process infers the presence of an edge between these sample locations and proceeds to generate an interpolated second signal value, for a non-sampled location between the sampling locations for which the measurement was carried out, in accordance with a first predetermined relationship (a linear equation) between the first and second characteristics of the image. Otherwise, a linear proportional multiplier is employed.

16 Claims, 2 Drawing Sheets

MECHANISM FOR PRODUCING INTERPOLATED COLOR VALUES FOR A SAMPLED COLOR IMAGE SIGNAL USING A LINEAR EQUATION TECHNIQUE

FIELD OF THE INVENTION

The present invention relates in general to color imagery signal processing and is particularly directed to a mechanism for interpolating color band signal values so as to substantially reduce color fringing in the neighborhood of a color edge.

BACKGROUND OF THE INVENTION

Multi-channel (e.g. three color band, luminance band) imagery sensing devices, such as a digital RGB video camera, typically produce output signals whose sampling frequencies differ, with one channel (usually one of the green or the luminance channel) being fully sampled, while the other channels (the red and blue channels) carry lower resolution data. For example, in a miniaturized charge-coupled device camera, the amount of green information may be two or three times that of the red or blue data. Moreover, in color image compression telecommunication systems, it is common practice to subsample the chrominance channels prior to applying the data to a compression mechanism, for the purpose of further reducing the amount of data to be transmitted.

Because of this reduction in the amount of information through which the original image has been defined, upon reconstruction, it is necessary to fill in or interpolate values for non-sampled image locations. A widespread technique for carrying out the interpolation process is to conduct a one or two-dimensional linear interpolation for computing values of image locations where there is no chrominance information from adjacent pixels where chrominance values are available. Typically, the interpolated value is a color difference signal, such as an I, Q, R-G, or B-G signal. Unfortunately, such an interpolation process yields color artifacts at edges between regions of different color, so that the colored component of the edge is not as sharp as the luminance component, which reduces the quality of both photographic images and video images of real scenes.

SUMMARY OF THE INVENTION

In accordance with the present invention, the above-described color fringing of edges between regions of different color in images that are processed by conventional interpolation mechanisms is effectively avoided by means of a new and improved signal processing technique that infers the existence of a color edge in response to prescribed changes in image characteristics at sample points for which data is available, and then interpolates intermediate values that are associated with a color edge. More particularly, the invention is directed to a method of processing sampled signal values produced by a color imaging device, in which a first of the sampled signal values is associated with a first band containing information of first characteristics (e.g. a prescribed chrominance component, such as green) of the input image, sampled at a first spatial frequency, and a second of the sampled signal values is associated with a second band containing information of second characteristics (e.g. a prescribed chrominance component differential, such as a red-green value) of the input image, sampled at a second spatial frequency, lower than the first spatial frequency, so that interpolation of the second signal values is required. Pursuant to the inventive interpolation mechanism, differences between first sampled signal values, associated with sampling locations of the second sampled signal values, are measured. If the measured difference for successive first sample values is greater than a prescribed threshold value, the process infers the presence of an edge between these sample locations (where second sampled values are not provided) and proceeds to generate an interpolated second signal value, for a non-sampled location between the sampling locations for which the measurement was carried out, in accordance with a first predetermined relationship (a linear equation) between the first and second characteristics of the image. The linear equation preferably is of the form:

$$S2 = a*S1 + b,$$

where
- S2 is the interpolated second signal value,
- S1 is the first signal value associated with the interpolation (non-sampled) location, and
- a and b are proportionality constants derived in accordance with first and second signal values associated with sampling locations.

Should the measured difference be less than or equal to the threshold value, no color edge is inferred and the second signal value is interpolated in accordance with a second predetermined relationship (proportionality multiplier) between the first and second characteristics of the image. Analyses of color images processed in accordance with the interpolation mechanism of the present invention reveal improved edge rendition without introducing any new image artifacts, even when the number of interpolation locations is as large as four or eight. Such a large subsample factor would produce poor quality images obtained exclusively by linear interpolation.

DETAILED DESCRIPTION

Figure 1:
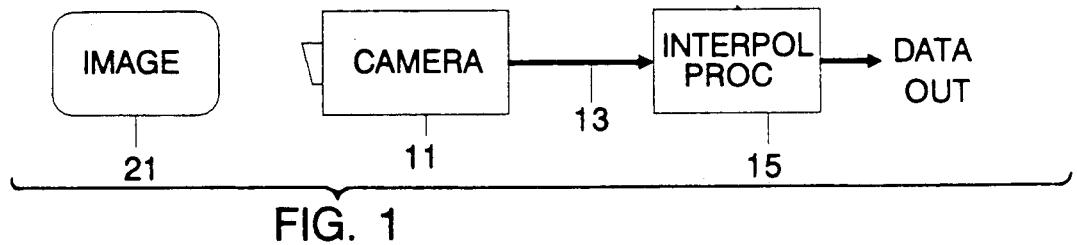
FIG. 1 diagrammatically shows a color image processing system employing a dedicated color sample interpolation processor.

Before describing the details of an embodiment of the present invention, it should be observed that the invention resides primarily in a novel color imagery signal interpolation mechanism, rather than a particular implementation of that mechanism. Thus, although, in its preferred embodiment, the invention is implemented using a programmed digital computer, the interpolation mechanism may be carried out by means of a variety of structural combinations of conventional signal processing circuits and components, such as custom-configured integrated circuit hardware. Accordingly, the structure, control and arrangement of the signal processing hardware of an embodiment of the invention have been illustrated in the drawings by a readily understandable block diagram, which shows only those specific details that are pertinent to the present invention, so as not to obscure the disclosure with structural details which will be readily apparent to those skilled in the art having the benefit of the present description.

Referring now to FIG. 1, a color image processing system is diagrammatically shown as comprising a color image transducer device, such as a digital RGB video camera 11, that supplies over its output link 13 image characteristic-representative digital signals, such as respective red, green and blue channel signal values representative of the red, green and blue color band components of a color image 21, light from which is incident upon an opto-electronic conversion matrix within the camera. As noted previously, when image 21 is scanned by camera 11, the sampling frequency is not the same for each of the respective image information bands. Typically, green is fully sampled, while red and blue are sampled at a lower frequency. As a consequence, the sampled values on link 13 are coupled to an interpolation processor 15 (e.g. a microprocessor programmed to execute the interpolation procedure set forth in detail below) which derives values for those portions (pixel locations) of an image that lie between fully sampled pixels. In the present description, those pixels that are fully sampled will be denoted by the reference character Y, while the subsampled components will be denoted by the reference character C.

Figure 2:
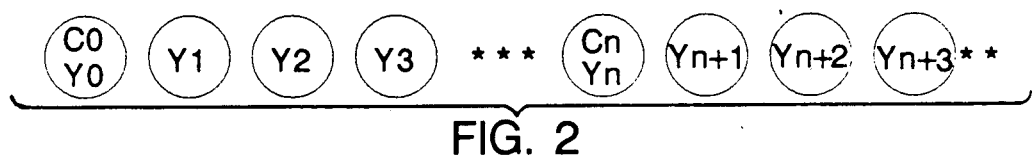
FIG. 2 diagrammatically illustrates a portion of one row of a two-dimensional pixel array and the sampling of the pixel locations within the row to produce differentially sampled signal values.

FIG. 2 diagrammatically illustrates a portion of one row of a two-dimensional pixel array and the sampling of the pixel locations within that row to produce differentially sampled signal values for Y and C. In the illustrated example, Y is sampled for each pixel, whereas C is sampled every nth pixel, where the subsample factor n typically has values such as 2, 4 or 8. It is necessary, therefore, to interpolate C values for the non-sampled pixels.

As pointed-out briefly above, a conventional technique for carrying out the interpolation process is to conduct a one or two-dimensional linear interpolation process in which the interpolated value is color difference signal, such as an I, Q, R-G, of B-G signal. Unfortunately, such an interpolation process yields color artifacts at edges between regions of different color, whereby the colored component of the edge is not as sharp as the luminance component, which reduces the quality of the image.

Figures 3A, 3B:
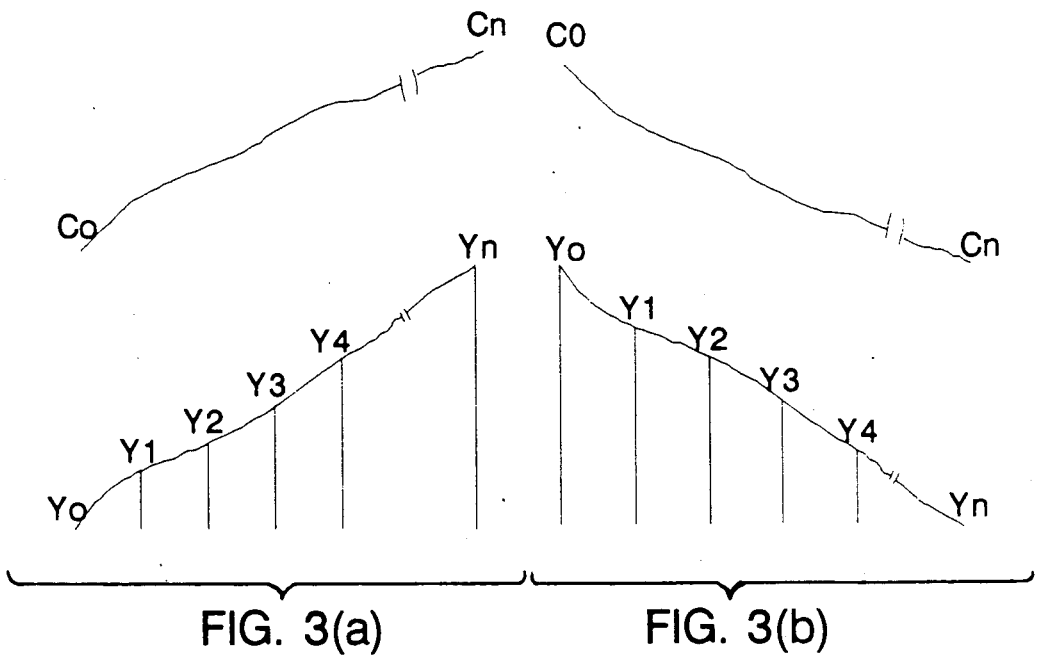
FIGS. 3(a)–3(d) show substantially continuous and stepwise variations in image characteristics between fully sampled locations 0 and n.
Figure 3C:
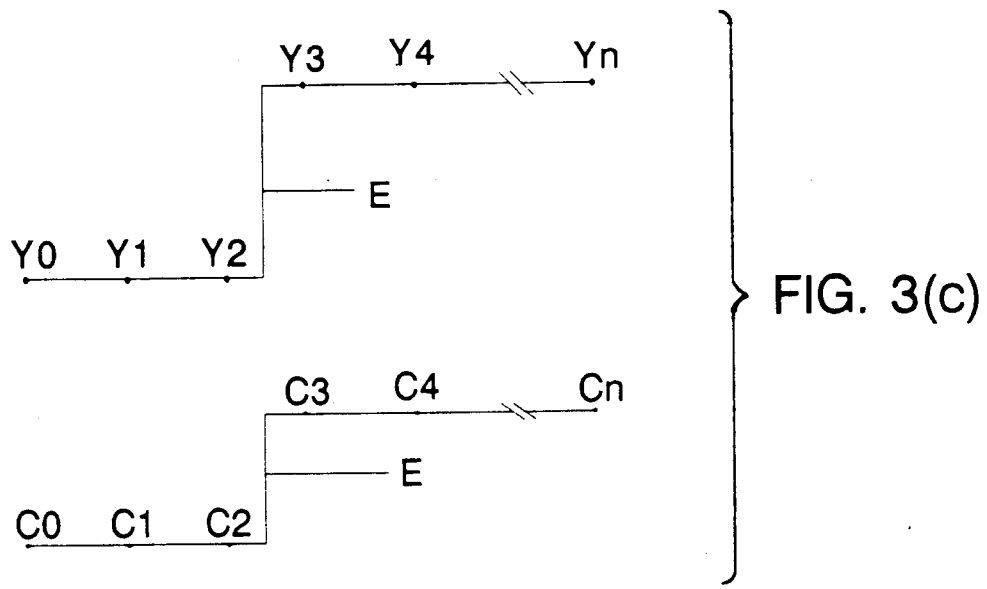
Figure 3D:
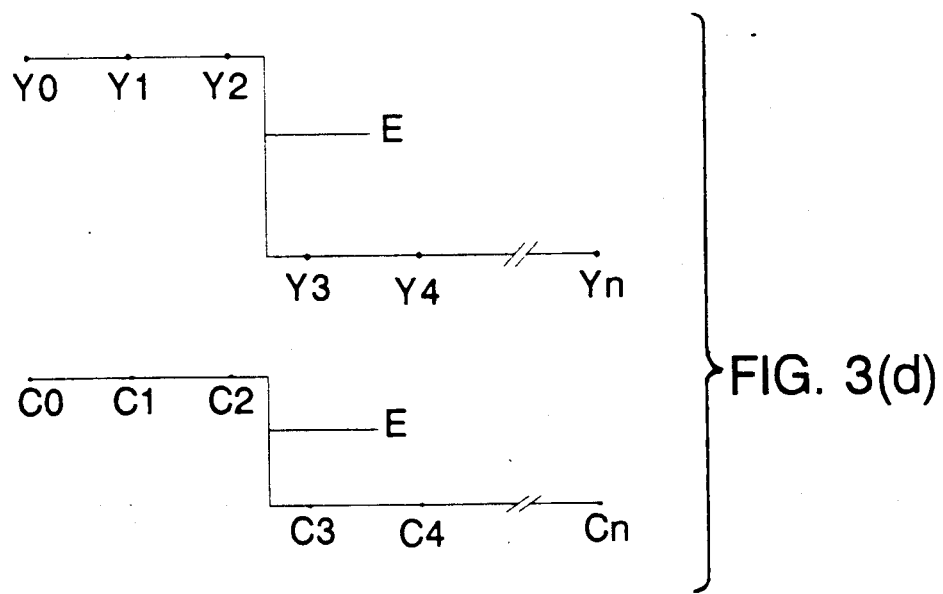

This difference may be understood by comparing the C and Y values for image characteristics that vary in a substantially continuous manner, either increasing, as shown in FIG. 3(a) or decreasing, as shown in FIG. 3(b), with image characteristics that vary abruptly, either as a step increase, as shown in FIG. 3(c), or as a step decrease, as shown in FIG. 3(d). In FIGS. 3(a) and 3(c) and in FIGS. 3(b) and 3(d), the values C0,Y0 and Cn,Yn at respective, fully sampled locations 0 and n are the same. However, the manner in which the image characteristic varies between the fully sampled locations is significantly different. The conventional linear interpolation mechanism, which produces a satisfactory result for the variations shown in FIGS. 3(a) and 3(b), effectively provides an average of the sampled values. Where the interpolated locations, such as locations 2 and 3, fall in the vicinity of an edge E, simply averaging the values obtained from the fully-sampled points 0 and n produces interpolated values that are sufficiently offset from the true image characteristic to cause a color fringing effect about the edge transitions E.

This fringing problem is solved in accordance with the present invention by comparing the difference between fully sampled (Y) values for successive pixel locations with a threshold. If the threshold is exceeded (suggesting a stepwise signal excursion) then an edge between fully sampled locations is inferred. Non-sampled C values at pixel locations between the fully sample points are then interpolated using a linear equation of the form $C = a*Y + b$, where C is the interpolated signal value, Y is the fully sampled signal value associated with the interpolation (non-sampled) location, and a and b are proportionality constants derived in accordance with Y and C signal values associated with fully sampled locations. If the threshold is not exceeded, then the non-sampled C values are interpolated using a linear interpolation operator of the form:

$$Ci = ((n-i)*C0 + i*Cn)/n,$$

namely, a proportionality multiplier. The threshold itself may be determined empirically in accordance with the properties of the image and is preferably set to be somewhat larger than the standard deviation of the noise in the fully sampled Y signal. On the one hand, this standard deviation setting avoids magnification of noise in the Y signal values into the interpolated C values if the threshold is too small and, conversely, effectively reduces the process to straight linear interpolation if the threshold is set too large.

The particulars of the interpolation mechanism in accordance with the present invention that is executed by interpolation processor 15 on the data values supplied over link 13 are as follows. As sampled signal values C0, Cn, C2n, C3n, . . . etc., Y0, Y1, Y2, . . . Yn−1, Yn, Yn+1, . . . Y2n−1, Y2n, Y2n+1, . . . Y3n−1, Y3n, Y3n+1, . . . etc., are output from video camera 11, they are coupled over link 13 to interpolation processor 15. Alternatively, they may be buffered via a suitable storage medium, such as a video magnetic recorder tape for later application to the computer for processing. Similarly, image signals processed in accordance with the inventive interpolation mechanism carried out by processor 15 may be recorded for later display.

The initial step in the process is to determine the likelihood of an edge between fully sampled locations by comparing Y value difference measurements with the threshold. Thus, for an arbitrary pair of successive, fully-sampled locations 0 and n, the absolute value of the difference between the sampled Y values Y0 and Yn is determined and compared to the threshold. If the absolute value AV of the difference Yo−Yn is less than or equal to the threshold T, then an edge is not inferred and each value Ci at successive not fully-sampled points that lie between fully-sampled locations 0 and n is determined in accordance with the linear interpolation expression:

$$Ci = ((n-i)*C0 + i*Cn)/n.$$

If, on the other hand, the absolute value AV exceeds the threshold T, an edge between fully sampled locations 0 and n is inferred, so that at any location i between points 0 and n, C is related to Y by the above expression $C = a*Y + b$. Specifically, a proportionality constant K is defined on the basis of the sampled C and Y values at the fully sampled end points 0 and n as:

$$K=(Cn-C0)/(Yn-Y0),$$

and a preliminary interpolated value of Ci at pixel location i between locations 0 and n is defined by the expression:

$$Cil=K*(Yi-Y0)+C0.$$

In order to prevent spurious large excursions in the C value from introducing humanly observable anomalies in the reproduced picture, the interpolated value of C is constrained within the range defined by C0 and Cn. For this purpose, the value of Cil is compared with C0 and Cn. If Cil is greater either of C0, Cn, then Ci is made equal to the larger of C0, Cn. Similarly, If Cil is less than either of C0, Cn, then Ci is made equal to the smaller of C0, Cn. Otherwise, Ci is made equal to the preliminary interpolated value Cil.

As will be appreciated from the foregoing description, by selectively inferring the existence of a color edge in response to prescribed changes (exceeding a threshold) in image characteristics at sample points for which data is available, and then interpolating intermediate values that are associated with a color edge through the use of linear equation for defining the relationship between sampled signal values, color fringing of edges between regions of different color in images that are processed by a conventional linear interpolation technique is effectively avoided. Analyses of color images processed in accordance with the foregoing thresholding mechanism reveal improved edge rendition without introducing any new image artifacts, even when n is as large as 4 or 8. Such a large subsample factor produces poor quality images obtained by linear interpolation alone.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. A method of processing sampled signal values, produced by a color imaging device, representative of respectively different information contents of an input image, a first of said sampled signal values, associated with a first band containing information of first characteristics of said input image, being sampled at a first spatial frequency, and a second of said sampled signal values, associated with a second band containing information of second characteristics of input image, being sampled at a second spatial frequency, lower than said first spatial frequency, said method producing interpolated second signal values for locations of said image, between sampling locations thereof, at which second signal values are not sampled, comprising the steps of:
   (a) measuring the difference between first sampled signal values associated with sampling locations of said second sampled signal values;
   (b) in response to the difference measured in step (a) being greater than a prescribed threshold value, generating an interpolated second signal value, for a non-sampled location between the sampling locations for which measuring step (a) was carried out, in accordance with a first predetermined relationship between first and second characteristics of said image; and
   (c) in response to the difference measured in step (a) being no greater than said prescribed threshold value, generating said interpolated second signal value in accordance with a second predetermined relationship between said first and second characteristics of said image.

2. A method according to claim 1, wherein said first predetermined relationship defines said interpolated second signal value as a first function of a first sampled signal value associated with said non-sampled location.

3. A method according to claim 2, wherein said second predetermined relationship defines said interpolated second signal value as a second function of first sampled signal value associated with said non-sampled location.

4. A method according to claim 3, wherein said second predetermined relationship defines said interpolated second signal value in proportion to the first sampled signal value associated with said non-sampled location.

5. A method according to claim 1, wherein said first predetermined relationship defines said interpolated second signal value as a linear equation in which the first sampled signal value associated with said non-sampled location is a variable.

6. A method according to claim 5, wherein said first predetermined relationship defines said interpolated second signal value in accordance with the linear equation:

$$S2=a*S1+b,$$

where
   S2 is said interpolated second signal value,
   S1 is said first signal value associated with said non-sampled location, and
   a and b are proportionality constants derived in accordance with first and second signal values associated with said sampling locations.

7. A method according to claim 6, wherein step (b) includes the step of constraining the interpolated second signal value S2 in accordance with signal values at said sampling locations.

8. A method according to claim 7, wherein step (b) comprises, in response to the interpolated value being greater than either of the signal values at said sampling locations, constraining the interpolated second signal value S2 at the larger of said signal values at said sampling locations and, in response to the interpolated value being less than either of the signal values at said sampling locations, constraining the interpolated second signal value S2 at the lesser of said signal values at said sampling locations.

9. A method of processing sampled color image signal values, produced by a color imaging device, representative of the color contents of an input image, for respectively different color bands, a first of said sampled color image signal values, associated with a first of the color contents of said input image, being sampled at a first spatial frequency, and a second of said sampled color image signal values, associated with a second of the color contents of said input image, being sampled at a second spatial frequency, lower than said first spatial frequency, said method producing interpolated second color image signal values for locations of said image, between sampling locations thereof, at which second color image signal values are not sampled comprising the steps of:

(a) measuring the difference between first sampled color image signal values associated with sampling locations of said second sampled color image signal values;

(b) in response to the difference measured in step (a) being greater than a prescribed threshold value, generating an interpolated second color image signal value, for a non-sampled location between the sampling locations for which measuring step (a) was carried out, in accordance with a first predetermined relationship between first and second characteristics of said image; and (c) in response to the difference measured in step (a) being no greater than said prescribed threshold value, generating said interpolated second color image signal value in accordance with a second predetermined relationship between said first and second characteristics of said image.

10. A method according to claim 9, wherein said first predetermined relationship defines said interpolated second color image signal value as a first function of a first sampled color image signal value associated with said non-sampled location.

11. A method according to claim 10, wherein said second predetermined relationship defines said interpolated second color image signal value as a second function of first sampled color image signal value associated with said non-sampled location.

12. A method according to claim 11, wherein said second predetermined relationship defines said interpolated second color image signal value in proportion to the first sampled color image signal value associated with said non-sampled location.

13. A method according to claim 9, wherein said first predetermined relationship defines said interpolated second color image signal value as a linear equation in which the first sampled color image signal value associated with said non-sampled location is a variable.

14. A method according to claim 13, wherein said first predetermined relationship defines said interpolated second color image signal value in accordance with the linear equation:

$$S2 = a^*S1 + b,$$

where
- S2 is said interpolated second color image signal value,
- S1 is said first color image signal value associated with said non-sampled location, and
- a and b are proportionality constants derived in accordance with first and second color image signal values associated with said sampling locations.

15. A method according to claim 14, wherein step (b) includes the step of constraining the interpolated second color image value S2 in accordance with color image signal values at said sampling locations.

16. A method according to claim 15, wherein step (b) comprises, in response to the interpolated value being greater than either of the color image signal values at said sampling locations, constraining the interpolated second color image value S2 at the larger of said color image signal values at said sampling locations and, in response to the interpolated value being less than either of the color image signal values at said sampling locations, constraining the interpolated second color image value S2 at the lesser of said color image signal values at said sampling locations.

* * * * *